United States Patent [19]

Darrow et al.

[11] 4,326,603
[45] Apr. 27, 1982

[54] LUBRICATION CONTROL APPARATUS

[75] Inventors: Berwin W. Darrow, Endwell; David J. Wilkinson, Vestal, both of N.Y.

[73] Assignee: International Business Machines Corporation, Armonk, N.Y.

[21] Appl. No.: 104,607

[22] Filed: Dec. 17, 1979

[51] Int. Cl.³ .............................................. F01M 1/18
[52] U.S. Cl. ................................... 184/6.1; 308/5 R
[58] Field of Search .................. 184/6.1, 6.4, 6.14, 184/6, 1 R; 308/5 R

[56] References Cited

U.S. PATENT DOCUMENTS

| | | | |
|---|---|---|---|
| 3,463,268 | 8/1969 | Krause | 184/6.1 X |
| 3,578,112 | 5/1971 | Freeland | 184/6.1 |
| 3,674,112 | 7/1972 | Roberts | 184/6.1 |
| 3,856,114 | 12/1974 | Zankl | 184/6.1 |
| 3,947,836 | 3/1976 | Smith et al. | 184/6.4 X |

*Primary Examiner*—David H. Brown
*Attorney, Agent, or Firm*—Kenneth P. Johnson

[57] ABSTRACT

Automatic lubrication control system in which current flow between two mating electrically conductive, lubricated members in sliding contact is integrated with respect to time and used to provide a control signal for a pump that applies lubricant to the contact surface. The voltage level resulting from the integrated current flow can be applied directly to control the pump circuit or it can be counted or sampled at preselected times to provide the pump actuating signal.

7 Claims, 4 Drawing Figures

LUBRICATION CONTROL APPARATUS

BACKGROUND OF THE INVENTION

This invention relates generally to apparatus for applying lubricant to frictional surfaces and more particularly to apparatus for automatically metering the lubricant to the surface in accordance with the need therefor.

Automatic lubrication systems are well known in the art. These systems have been devised to reduce the need for maintenance personnel and to provide continuous protection during the operation of the mechanisms. The known systems, however, frequently have not been satisfactory because of two primary disadvantages; some systems apply lubricant at fixed intervals which are not a function of the need, and other systems are not sufficiently sensitive to apply the lubricant at the immediate time of need.

Representative of the first group are those systems which supply lubricant according to a count or at different rates depending upon the velocity of the mechanism. U.S. Pat. No. 3,856,114 is of this type in that lubricant application varies in accordance with the feed rate of a mechanism. Such control systems require careful and frequent calibration to insure that a sufficient and yet not excessive amount of lubricant is applied. Other techniques have used a fixed amount of operating time to actuate the lubrication mechanism.

Other patents relating to the second group, such as U.S. Pat. Nos. 3,463,268 and 3,674,112, respectively sense an increase in driving power or an increase in the bearing temperature to provide actuating signals for the lubricating devices. These arrangements have the weakness that they fail to differentiate between either changes in loads on the mechanism or changes in environmental temperature. Hence, they lack the sensitivity to apply lubricant at the most appropriate times to minimize wear or damage.

OBJECTS AND SUMMARY OF THE INVENTION

It is accordingly a primary object of this invention to provide automatic lubricating apparatus for relatively moving members having improved sensitivity to the need for applying lubrication to the members.

It is another important object of this invention to provide automatic lubricating apparatus for relatively moving members which is effective independent of the velocity and temperature of the members and independent of the rate variations of the lubricant applicator output.

Still another object of this invention is to provide automatic lubrication apparatus which integrates current flow during movement between relatively movable, conductive members to determine the need for lubricant and using that integrated value for controlling the application of lubricant.

The foregoing objects are attained in accordance with the invention by providing circuit means for applying a voltage across two conductive members having frictional contact and relative motion while integrating current flow with respect to time, and applying the electrical potential value resulting from said integration by means of a comparator to means responsive thereto for applying lubricant to the contact surfaces of said members.

By means of the invention, the resistance of the electrical path between the two mating members during motion is continually monitored and lubricant applied when the contact versus noncontact time between the members reaches a preselected level. The continual monitoring and the addition of metered amounts of lubricant enables the system to be controlled for the proper lubricant film thickness sufficiently early in the operating period to prevent damaging wear. In addition, the signal at the output of the comparator can be used to indicate lubrication failures due to pump breakdown, broken oil lines or empty oil reservoir.

The invention also aids in the selection of proper lubricants by enabling early determination of film breakdowns. Integrated current flow resulting from changing impedance between two relatively moving members provides efficient indication of the failure of lubricants, thus avoiding the necessity of extensive operational testing and measuring for surface wear.

The foregoing and other objects, features and advantages of the invention will be apparent from the following more particular description of preferred embodiments of the invention, as illustrated in the accompanying drawing.

BRIEF DESCRIPTION OF THE DRAWING

FIG. 3 is a schematic diagram of an alternative embodiment of the circuit in FIG. 1 in which the lubrication applicator means is controlled for different periods.

DESCRIPTION OF THE PREFERRED EMBODIMENTS

Figure 1:
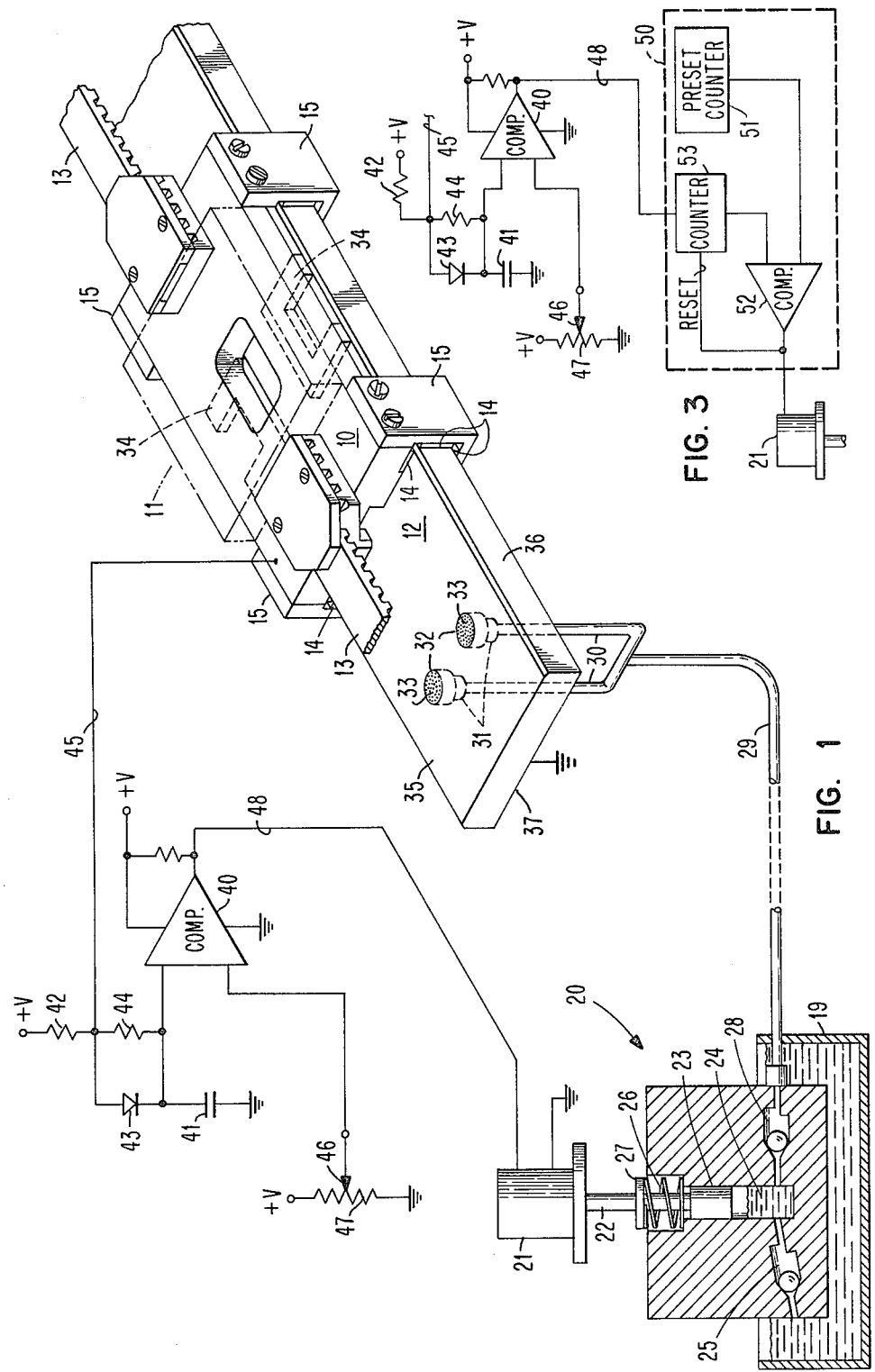
FIG. 1 is a schematic diagram of a lubrication system constructed in accordance with the principles of the invention.

Referring to FIG. 1, there is shown a typical reciprocating slider arrangement in which a slider 10 having a load 11, indicated in phantom, is reciprocated along a guide bar 12. The load-bearing slider 10 may be reciprocated by any suitable means such as a motor (not shown), driving belt 13, or cam and lever arrangement connected to the slider. The slider is supported on bar 12 by guide pads 14 attached to the underside of the slider and angle brackets 15 to thus confine the slider to the desired path of motion. Because the guide pads provide support for the slider with respect to the bar, a film of lubricant is required at those surfaces. Slider 10, guide bar 12 and guide pads 14 are formed of electrically conductive material, usually steel or bronze.

The required lubricant, such as oil, is supplied to bar 12 by a solenoid pump, indicated generally as 20, in source 19, and can be any of several suitable known pumps. The one shown comprises a solenoid 21, a plunger 22 having a piston 23 which reciprocates within a cylinder 24. The reciprocation of the piston serves to draw oil into the cylinder through an inlet check valve 25 during the restoration stroke of the piston by the urging of spring 26 against collar 27.

During the energization of the solenoid 21, piston 23 is forced downwardly against the action of spring 26 to force the oil in the cylinder out through check valve 28 through duct 29 where the lubricant divides through a pair of ducts 30. These ducts each connect with a respective bore 31 through bar 12 to communicate with counterbores 32 and wicks 33 so that the oil saturates the wicks. As slider 10 is reciprocated along bar 12, a pair of U-shaped wicks 34, placed within recesses on the underside of the slider body and shown in phantom, ride over a respective one of the wicks 33 picking up lubricant therefrom. Thereafter, during reciprocation of the slider, the lubricant from the U-shaped wicks is spread by its wetting action and by guide pads 14 along the upper surface of the slider, edge surfaces 36, and bottom surface 37.

The circuit for controlling the lubricant pump comprises a comparator circuit 40 to which is supplied an input signal and reference voltage. An input signal is obtained by means of an R-C network of capacitor 41 charged through resistor 42 and diode 43 from a source voltage. Resistor 44 provides a discharge path and determines the discharge rate of capacitor 41 from a junction between resistors 42 and 44 along line 45 to reciprocating slider 10 through guide bar 12 which is connected to ground. Reference voltage for comparator 40 is selected via center tap 46 from variable resistor 47 connected between a voltage source and ground.

In operation, capacitor 41 is charged via resistor 42 and diode 43, and is usually maintained at a sufficiently high voltage relative to reference voltage at tap 46 to prevent an actuating output signal from the comparator circuit. Assuming there is an adequate oil film between slider 10 and guide bar 12, only a small amount of current leakage occurs from capacitor 41 to ground via resistor 44 and line 45 because of the high impedance of the lubricant film at the slider-guide bar junction with respect to the resistor 42.

As the slider and its attached guide pads 14 reciprocate along guide bar 12, occasional metal-to-metal contact occurs or the lubricant film becomes so thin as to provide a low impedance path to ground from the junction of resistors 42 and 44, allowing electrical discharge in proportion to the time and impedance of the slider-guide bar contact. If sufficient discharge of the capacitor occurs with respect to the reference voltage, the input signal between capacitor 41 and resistor 44 will fall below the reference voltage input causing the comparator circuit output signal to shift to an actuation signal level on line 48 and operate solenoid 21 causing lubricant to be discharged along duct 29 to the wicks 33 on the guide bar. By selecting particular reference voltage values and impedance values for the capacitor discharge circuit, the sensitivity of the comparator response can be adjusted to the needs of the slider mechanism.

Figure 2:
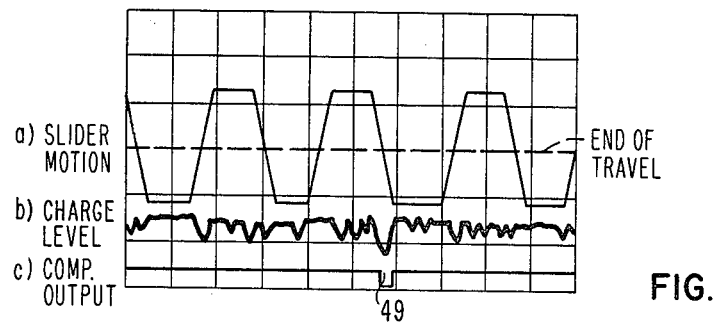
FIG. 2 is a diagram of electrical waveforms representing changing characteristics of the lubrication system during operation.

Breakdown of the lubricant film tends to occur more frequently at the ends of travel when the slider is accelerating or decelerating. This is believed to occur because of the failure to maintain a sufficient wedge of lubricant between the bearing surfaces. An example of the capacitor charge versus slider motion is shown in FIG. 2 in graphic form. Several cycles of operation are illustrated in waveform a in which the dashed line at 0 represents each end of travel for slider 10. The varying charge level of capacitor 41 is shown at waveform b. Comparator output is shown in waveform c, and an acutating pump signal takes place at 49. The film breakdown tends to occur during acceleration or deceleration at the ends of travel irrespective of the quantities of lubricant applied.

Since the direct coupling of the output of comparator 40 in FIG. 1 to the pump actuating solenoid 21 may supply too much lubricant if the pump is actuated for each comparator output, the control circuit may be modified. Such a modification requires the interposition of a control counter means between the comparator output and pump solenoid.

Such a circuit is shown in FIG. 3, where a control counter means 50 is placed between the output of comparator 40 on line 48 and the pump actuating solenoid 21. Counter means 50 comprises a presettable counter 51, which provides one input to a comparing circuit 52, and a counter circuit 53, which is advanced by signals occurring on line 48. An output from counter 53 is provided to comparing circuit 52 as a second input. When the counts of counter 51 and 53 are equal, an output occurs from compare circuit 52 to actuate pump solenoid 21. This signal is also used to reset counter 53. The circuit of FIG. 3 is responsive to the number of lubrication film breakdowns as sensed by the output of comparator 40, but is not sensitive to the number of reciprocations. Thus, as the film fails, lubrication will be applied as needed and when adequate lubrication is present, the counter is advanced less frequently, so it does not actuate the lubrication pump.

Figure 4:
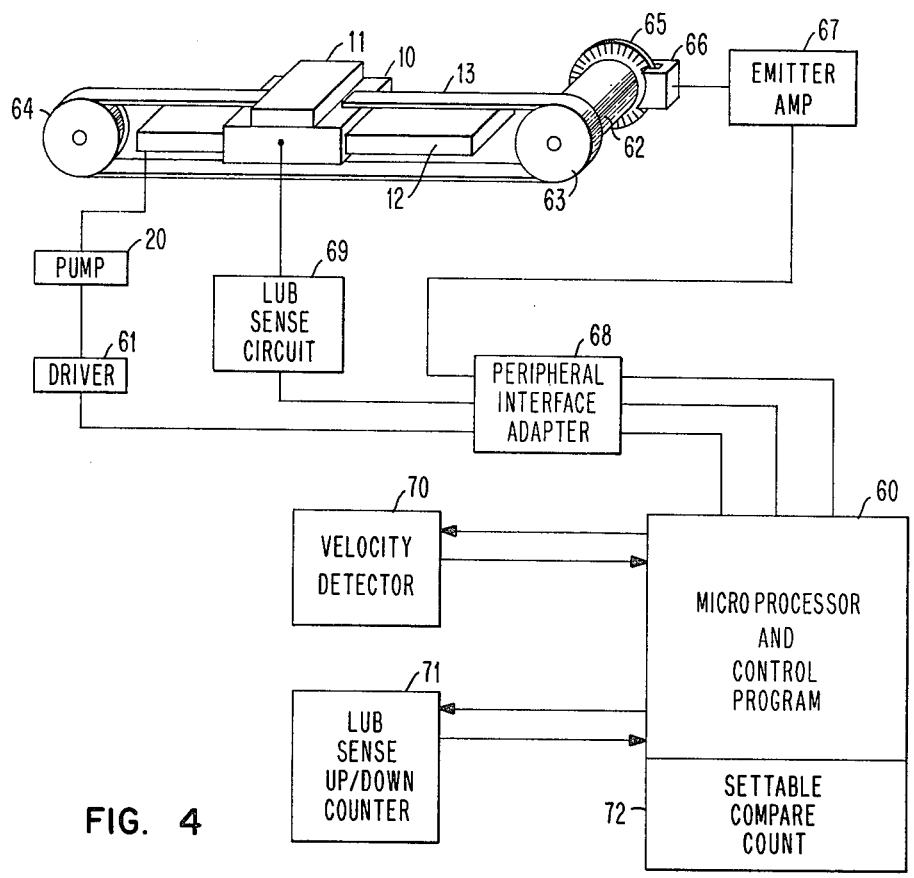
FIG. 4 is a schematic diagram of another alternative embodiment using a microprocessor as a control element for the lubricant.

In another alternative control circuit of FIG. 4, a microprocessor 60 with its control program serve as the actuating device for driver 61 and pump 20. Slider 10, mounted for reciprocation on guide bar 12, is actuated by a motor 62 driving pulley 63 and, in turn, power transmission belt 13 about idler pulley 64. The motor is equipped with a displacement emitter disk 65, typically a transparent disk with opaque marks, which is sensed by a pickup device 66 of light source and phototransistor. The phototransistor output is amplified at circuit 67 to provide an output pulse to peripheral interface adapter 68 for each unit of belt and slider displacement. The lubrication sense circuit, as shown in FIG. 1, is indicated by block 69. Its output line is supplied as an input to peripheral interface adapter 68. Driver circuit 61 for the pump 20 is also attached to the peripheral interface adapter. The adapter is, in turn, connected to the microprocessor and its control program 60.

Microprocessor 60 may be any of several commercially available devices, such as Motorola Model 6802 or Fairchild F8. In this arrangement the microprocessor monitors the output of the lubrication sense circuit 69 in relation to the velocity of the slider 10 via pulses from emitter amplifier 67. Pulses supplied to detector circuit 70 indicate to the microprocessor when the slider velocity exceeds a predetermined minimum enabling lubrication to be applied more accurately according to need. Lubricant failure and mechanical wear are sensitive to loading and surface velocity. A particular velocity, however, may produce disproportionate wear so that checking for adequate lubricant at that velocity is highly desirable. A velocity detection circuit for enabling the checking of the integrated current enables the selection of such velocities. For example, greater wear may occur in the disclosed arrangement only at periods of constant velocity and checking is to be restricted to those times.

In one mode of operation, microprocessor 60 receives the emitter signals which are applied by the microprocessor to velocity detection circuit 70 to which internal microprocessor clock signals are applied. The detection circuit thus determines the number of clock pulses between successive emitter pulses and indicates to the microprocessor whether the slider is up to the predetermned velocity previously set in the microprocessor. Thereafter, the lubrication sense circuit is checked by the microprocessor and, if its output level indicates lubrication is needed as described with reference to FIG. 1, an actuating pulse is transmitted through the peripheral interface adapter 68 and driver 61 to actuate pump 20.

A further option is available with microprocessor 60, which is to monitor the output of the lubrication sense circuit at predetermined intervals after the slider is up to velocity. With this technique, the microprocessor is interrupted to monitor the lubrication sense circuit only after the slider is up to speed indicated by velocity detection circuit 70, and a predetermined number of emitter pulses have been received. A count is applied to lubrication sense up/down counter 71. Up/down counter 71 maintains a running algebraic total of the status of the lubrication sense circuit 69 output each time microprocessor 60 checks that circuit.

For instance, if lubrication sense circuit 69 indicates adequate lubricant, a 1 is subtracted in counter 71. On the other hand, if lubrication sense circuit 69 indicates a breakthrough of the lubrication film and low capacitor charge level, that pulse level adds 1 in up/down counter 71. This resulting count is compared with the count in settable lubrication compare count 72. For example, the value in counter 72 may be set to a positive 100 which would thus provide a control signal to the microprocessor when accumulated value of counter 71 reached an equality with that set in counter 72. At that time, the microprocessor activates driver 61 and pump 20 through interface adapter 68 to apply more lubricant. The use of either positive or negative count indications is, of course, arbitrary.

The foregoing arrangements permit various levels of lubrication by setting predetermined velocity or count conditions when the lubrication sensing circuit is effective. The sensing circuit of the invention is use dependent and sensitive to various conditions as desired. It thus avoids fixed times for applying lubricant and insensitivity to load or temperature changes.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Lubrication control apparatus comprising:
   first and second relatively movable, electrically conductive members separated by an intermittently broken film of lubricant having high resistivity compared to the direct contact of said members;
   means for applying electric potential across said members and integrating current flow thereacross with respect to time during movement of said members; and 'means responsive to a predetermined integrated current level for applying additional lubricant between said members.

2. Apparatus as described in claim 1 wherein said means for applying electric potential and integrating circuit flow includes a capacitor and comparing means for comparing the potential on said capacitor with a reference potential.

3. Apparatus as described in claim 2 wherein said lubricant applying means includes a solenoid actuated pump means.

4. Apparatus as described in claim 1 further including means for generating signals representative of displacment of said first member relative to said second member, and velocity detection means for enablng said lubricant applying means when said relative motion of said members reaches a predetermined velocity.

5. Lubrication control apparatus comprising:
   first and second relatively moving, electrically conductive, lubricated members having an electrical path therebetween that varies in resistivity during said movement;
   means for applying electrical potential across said members and said path and integrating curent flow therethrough with respect to time during said movement; and
   means responsive to a predetermined value of said integrated current for applying additional lubricant to said members.

6. Lubrication control apparatus comprising:
   first and second relatively moving, electrically conductive, lubricated members having an electrical path therebetween that varies in resistivity during said motion;
   means for applying potential across said members and said path and integrating current flow therethrough with respect to time during said movement;
   means for sensing the level of current at said integrating means and providing first and second output signals representative of current levels above and below a predetermined value;
   counting means for accumulating a count of said second output signals; and
   means responsive to said counting means for applying additional lubricant between said members when said count reaches a predetermined value.

7. Apparatus as described in claim 6 wherein said counting means includes means for resetting said counting means upon reaching said predetermined value.

8. Apparatus as described in claim 6 further including control means for enabling said sensing means, and wherein said counting means includes a bidirectional counter responsive to both said first and second output signals to provide an algebraic sum thereof, and wherein said lubricant applying means is responsive to a predetermined sum for supplying additional lubricant between said members.

9. Apparatus as described in claim 6 further including velocity detection means for enabling said sensing means at a predetermined velocity.

10. Apparatus as described in claim 9 further including means providing signals indicative of displacement between said first and second members.

* * * * *